(12) United States Patent
Rodgers et al.

(10) Patent No.: US 8,144,451 B2
(45) Date of Patent: Mar. 27, 2012

(54) MOBILE ELECTRONIC DEVICE WITH DOVETAIL CONNECTOR

(75) Inventors: Daniel P. Rodgers, Arlington Heights, IL (US); Simon F. Vollmer, Hawthorn Woods, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 325 days.

(21) Appl. No.: 12/606,616

(22) Filed: Oct. 27, 2009

(65) Prior Publication Data

US 2011/0096472 A1    Apr. 28, 2011

(51) Int. Cl.
G06F 1/16    (2006.01)

(52) U.S. Cl. .................................... 361/679.01

(58) Field of Classification Search .............. 361/679.01
See application file for complete search history.

(56) References Cited

U.S. PATENT DOCUMENTS

| | | | |
|---|---|---|---|
| 2,544,105 A * | 3/1951 | Quick | 40/421 |
| 4,597,291 A * | 7/1986 | Motomiya | 73/431 |
| 4,680,674 A * | 7/1987 | Moore | 361/679.32 |
| 5,233,506 A * | 8/1993 | Semenik et al. | 361/814 |
| 5,402,095 A * | 3/1995 | Janniere | 235/441 |
| 5,457,520 A | 10/1995 | Schell et al. | |
| 5,809,403 A * | 9/1998 | MacDonald et al. | 455/575.7 |
| 5,873,554 A * | 2/1999 | Nobuchi | 248/278.1 |
| 5,925,847 A * | 7/1999 | Rademacher et al. | 174/372 |
| 6,015,303 A | 1/2000 | Bonilla et al. | |
| 6,208,874 B1 * | 3/2001 | Rudisill et al. | 455/575.4 |
| 6,808,239 B1 * | 10/2004 | Bader | 312/223.4 |
| 6,831,977 B2 * | 12/2004 | Kiernan et al. | 379/433.09 |
| 6,876,543 B2 * | 4/2005 | Mockridge et al. | 455/347 |
| 6,909,597 B2 * | 6/2005 | Tutikawa | 361/679.04 |
| 7,150,484 B2 | 12/2006 | Lota | |
| 7,499,031 B2 * | 3/2009 | Su et al. | 345/169 |
| 7,844,310 B2 * | 11/2010 | Anderson | 455/575.1 |
| 7,984,935 B2 * | 7/2011 | Luo et al. | 292/80 |
| 8,018,726 B2 * | 9/2011 | Friedlander et al. | 361/732 |
| 2007/0131778 A1 * | 6/2007 | Yang et al. | 235/486 |

* cited by examiner

Primary Examiner — Lisa Lea Edmonds
(74) Attorney, Agent, or Firm — Gary J. Cunningham

(57) ABSTRACT

An improved mobile electronic device is disclosed. The mobile electronic device (10) can include: a housing (12) including a front cover (14) and a rear cover (16), the rear cover (16) configured to interconnect with the front cover (14), defining an enclosure (18) for electrical components; a plurality of connectors (20) located on walls (22) of the front cover (14) and rear cover (16); the plurality of connectors (20) including a male portion (24) and a female portion (26) being substantially complementarily configured to receive the male portion (24). Advantageously, the connectors (20): provide a resilient interconnection, forming a robust housing; take up a minimal amount of room in the enclosure (18), for maximizing the area available for electronic component placement therein; and help to allow the profile, from the front cover (14) to rear cover (16), to be designed ultra thin.

19 Claims, 5 Drawing Sheets

MOBILE ELECTRONIC DEVICE WITH DOVETAIL CONNECTOR

BACKGROUND OF THE INVENTION

1. Field of the Disclosure

The disclosure relates in general to mobile devices, and more particularly, to mobile electronic devices with an electronic display and a connector. In certain embodiments, the mobile electronic device comprises a mobile telephone, but the disclosure is not limited to mobile telephones.

2. Background Art

There is a significant market for mobile electronic devices with large displays and thin profiles. Many have tried to provide housing for such devices, but are forced to use adhesives in ultra thin environments. A mobile electronic device with small but strong connectors would be considered an improvement in the art, as field workers could repair and rework them, in needed, rather than scraping such devices.

Further, when using resilient materials in housings for mobile electronic devices, connectors can become damaged upon assembly. Thus, robust connectors that can withstand assembly and tough users environments, would be considered an improvement in the art.

It is therefore, desirable to provide an improved mobile electronic device with connector, which overcomes most, if not all, of the preceding problems.

DETAILED DESCRIPTION OF THE INVENTION

Figure 1:
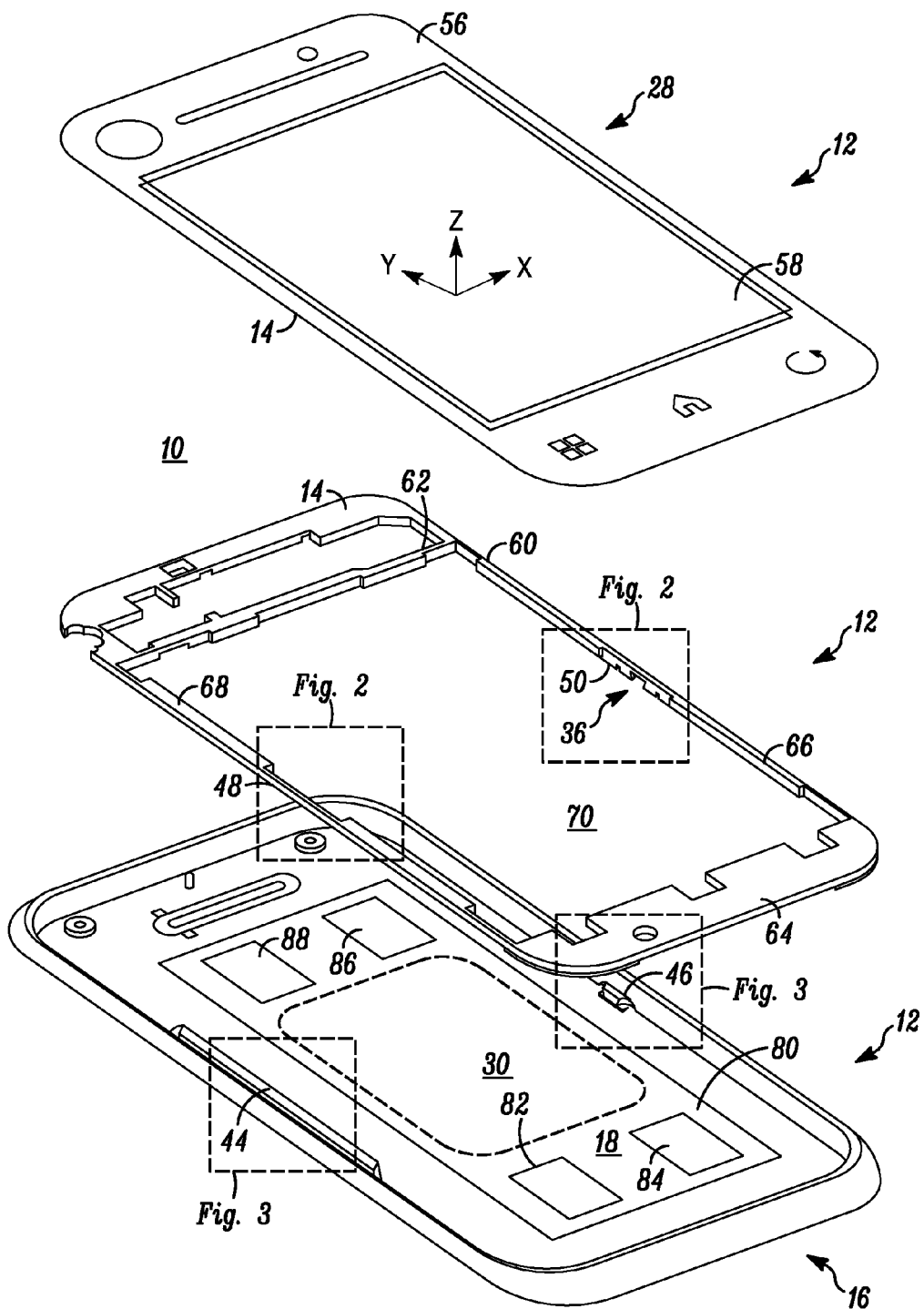
FIG. 1 is an isometric view of a mobile electronic device, showing a front and a rear cover, in accordance with principles of the present invention.

The following is a detailed description and explanation of the preferred embodiments of the invention and best modes for practicing the invention.

Referring to the drawings, a mobile electronic device 10 is shown. The mobile electronic device 10 in FIG. 1 can include: a housing 12 including a front cover 14 and a rear cover 16, the rear cover 16 configured to interconnect with the front cover 14 defining an enclosure 18 for electrical components; a plurality of connectors 20 located on walls 22 of the front cover 14 and rear cover 16; the plurality of connectors 20 including a male portion 24 and a female portion 26 being substantially complementarily configured to receive the male portion 24.

Advantageously, the plurality of connectors 20, provide a resilient interconnection, forming a resilient housing. Further, the plurality of connectors 20 take up a minimal amount of room in the enclosure 18, for maximizing the area available for electronic component placement and layout therein. The connectors can be assembled by pushing down, along a z-axis in FIG. 1, for simple snap-fit assembly. In one embodiment, an east leg 66 and west leg 68 can be squeezed slightly inwardly toward each other, due to their flexibility, while assembling for simplified assembly.

Yet further, the connectors 20 allow the profile of device 10, from the front cover 14 to rear cover 16, to be very thin or ultra thin, if desired.

As should be understood, the number and placement of the connectors can vary widely, so long as a robust connection is provided.

In one arrangement, the front cover 14 includes a touchscreen display 28 and the rear cover 16 includes a touchpad 30 positioned to be touched by a user's finger gestures, for navigating a user interface, without blocking a user's viewing of the touchscreen display. This provides multi-touch device for efficient operation by a user, for scrolling, gaming and the like.

The touchpad 30 (shown in phantom in FIG. 1) can provide navigation control in connection with the user interface (UI) on the display, such as, but not limited to: highlighting a web link on the display, scrolling through text on the display, clicking to enter a command on the display, and/or implementing a mouse cursor on the touchscreen. The touchpad can also comprise one or more of the following: a zoom control, a magnifier, scroll bar, scroll control, a slide bar in a browser window, enter key, command key, shift key, visual selector, cursor, and/or pointer. The touchpad 30 can occupy a substantial portion, such as from 25% to 75%, of the rear cover 16. In the illustrative embodiment, the touchpad is smaller and occupies a smaller area than either the touchscreen display 28.

The display 28 can comprise a touchscreen comprising a touch sensitive lens with an input lens surface. Touch sensors can be integrated to either the input surface or the opposite surface of the lens. The touch sensor generates a signal in response to a manually engageable haptic input from a user when the user touches the lens with a finger to emit light forming an image on the lens. The touchscreen display can be can be transparent, clear and light transmissive and can comprise a capacitive touchscreen, an organic light emitting display (OLED) or a liquid crystal display (LCD).

The mobile electronic device 10 can include at least one of: a flip phone, slider phone, portable networking device, internet communications device, clamshell device, tablet device, radio telephone, cellular phone, mobile phone, smart phone, portable gaming device, personal digital assistant, wireless e-mail device, two-way pager, mobile computing device and handheld electronic device. In a preferred embodiment, the mobile electronic device 10 is of a compact size, such as with a narrow profile (or ultra thin). Advantageously, the connectors 20 provide a robust and durable housing 12 in connection with any of the above uses and similar uses, as should be understood by those skilled in the art.

In one embodiment, the front cover 14 can include a three component structure including an inner assembly 60, a glass layer 56 and touch sensor 58 adhesively connected to each other around an outer periphery or rim, defined by the inner assembly 60, for improved structural integrity. The inner assembly 60 is constructed to fit into a portion of the rear cover 16, for providing a robust housing 12, with an enclosure 18 for electronic components.

Figure 5:
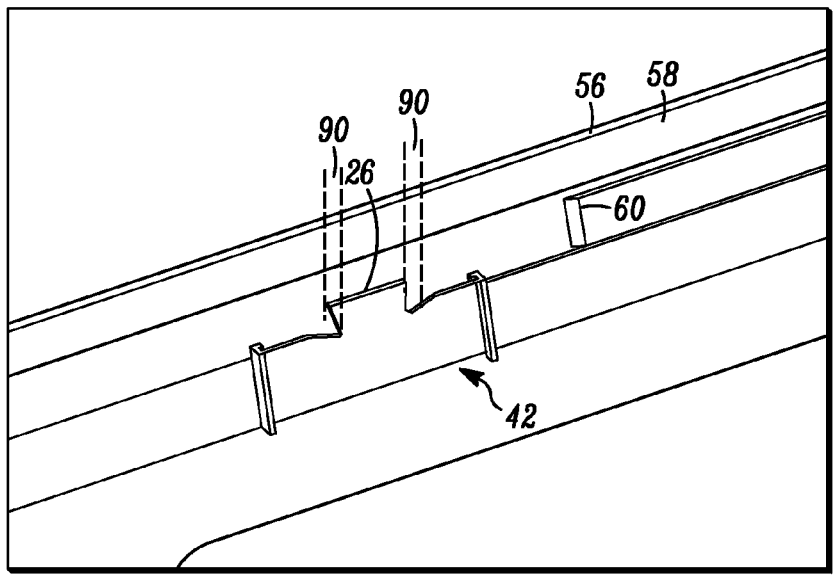
FIG. 5 is an enlarged partial perspective view of the assembled mobile electronic device shown at item 5 in FIG. 4, in accordance with principles of the present invention.

In more detail, as best shown in FIG. 5, the male portion 24, which is shown facing upwardly in the figure, includes a proximal portion 32 and a distal portion 34, with the distal portion 34 being larger in dimension than the proximal portion 32. This may be viewed as providing a partial, downwardly pointing triangular structure and the male portion 24 includes a base of the triangle facing upwardly. This structure provides a resilient construction and simplified interconnectability, in this application. A connection area is shown as dashed lines, at 90, which provides an area in the x, y and z axis, for providing a strong connection between the front and rear covers 14 and 16.

Figure 3:
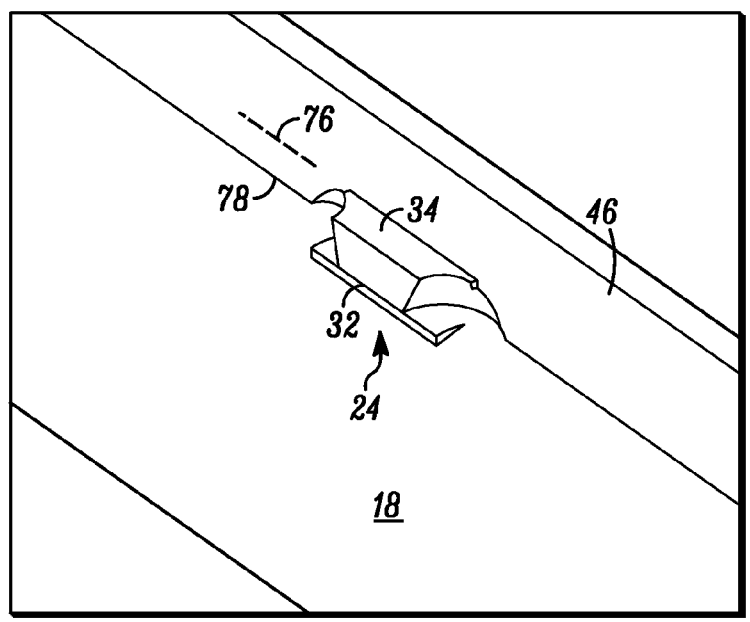
FIG. 3 is an enlarged partial perspective view of an embodiment of the mobile electronic device at item 3 shown in FIG. 1, showing a portion of a rear cover with a male portion of a connector, facing upwardly, in accordance with principles of the present invention.

Likewise, the female portion 26, as shown in FIG. 3, defines a slot 36 including a proximal portion 38 and a distal portion 40, with the distal portion 40 being smaller in dimensions than the proximal portion 38. The male portion 24 and the female portion 26 define a dovetail structure 42 forming a durable housing 12.

In yet more detail, and as shown in FIG. 1, in a preferred arrangement, the plurality of connectors 20 are located on at least two opposite interior walls, such as first and second interior walls 44 and 46 of the rear cover 16, facing substantially upwardly, and at least two opposite external walls, such as first and second external walls 48 and 50, of the front cover 14, facing substantially downwardly. This structure provides ease of connection and assembly.

As should be understood, the housing may be made of a host of materials, such as plastics and metals, for example. In a preferred embodiment, at least one of the front cover 14 and rear cover 16 comprises a resilient material, and more preferably comprising aluminum. Advantageously, aluminum provides good durability and the connectors are particularly adapted and configured for use with metals, such as aluminum.

Figure 6:
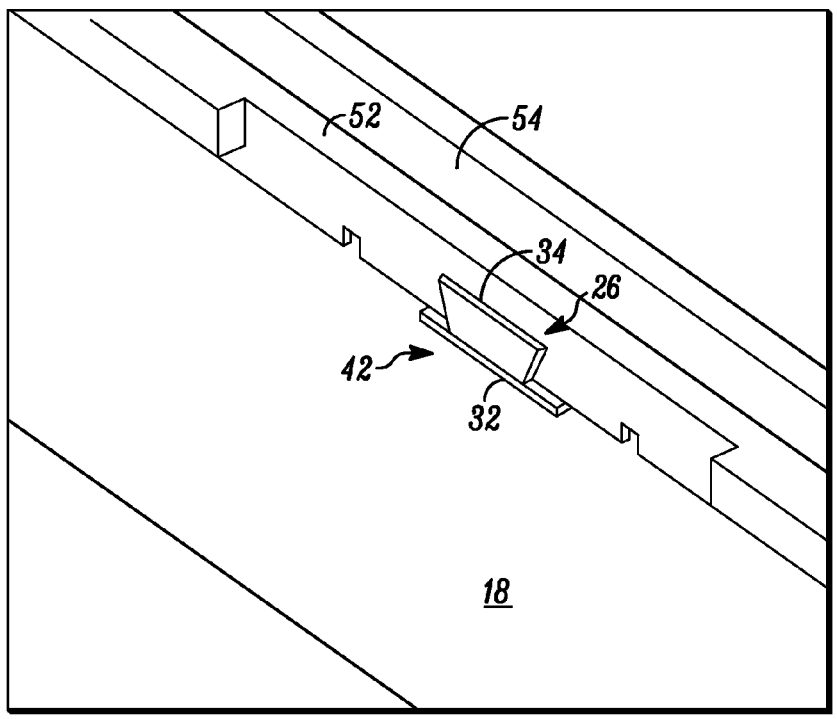
FIG. 6 is an enlarged partial perspective view of the assembled mobile electronic device shown at item 6 in FIG. 4, with a display shown clear for the reader, in accordance with principles of the present invention.

As shown in FIG. 6, at least a portion 52 of the front cover 14 is configured to be received in a portion 54 of the rear cover 16, for enhanced durability, connection and a desired narrow profile housing 12.

In a preferred embodiment, the front cover 14 in FIG. 1, includes a glass layer 56, touch sensor 58 and an inner assembly 60 configured to be at least partially received 54 in a portion of the rear cover 16, for providing a touch display user interface and a narrow profile housing 12.

Figure 2:
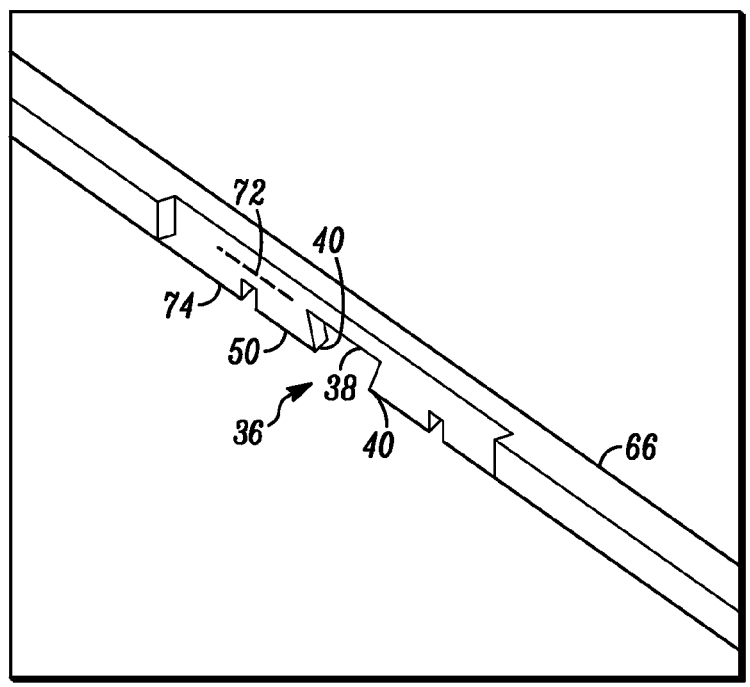
FIG. 2 is an enlarged partial perspective view of an embodiment of the mobile electronic device at item 2 shown in FIG. 1, showing a portion of a front cover with a female portion of a connector facing downwardly, in accordance with principles of the present invention.

The inner assembly 60 can include a north leg 62, a south leg 64, an east leg 66 and a west leg 68 defining an opening 70, with the plurality of connectors being located on at least two opposite legs, the plurality of connectors 20 being downwardly facing female portions 26 extending from about a midpoint 72 to a bottom 74 of the legs 66, as shown in FIG. 2. Likewise, as shown in FIG. 3, the rear cover 16 includes the plurality of connector(s) 20 including upwardly facing male portions 24 extending from about a middle portion 76 to a bottom portion 78 of the walls 46. This structure provides a robust dovetail construction and interconnection.

The mobile electronic device 10 can be a tablet or candy bar type cellphone, as shown in FIG. 1. Electrical components such as a printed circuit board 80, ICs 82, a processor 84, transceiver 86, battery 88, a speaker, an antenna and microphone, would be substantially enclosed in enclosure 18. This provides a lightweight device with a touch screen, which is narrow in profile.

Figure 7:
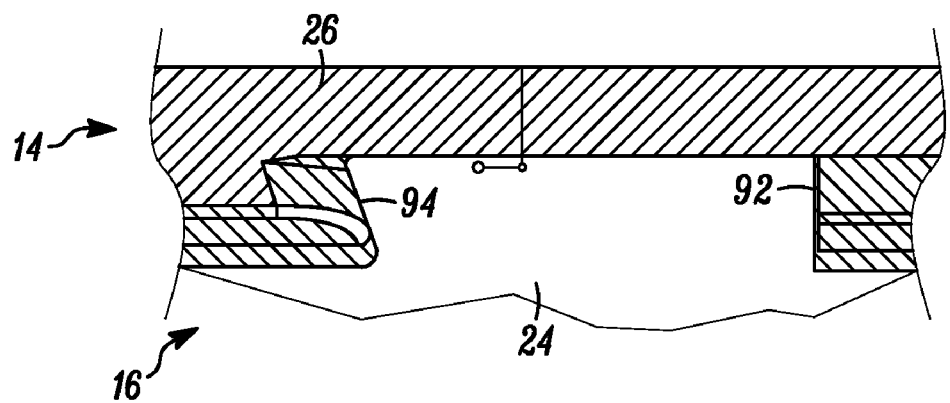
FIG. 7 is an enlarged cutaway, side view of the assembled mobile electronic device in FIG. 6, showing an upwardly facing male portion and a downwardly facing female portion and of the front cover and rear cove, respectively, with a vertical section and an angled section, in accordance with principles of the present invention.

Turning to FIG. 7, an enlarged cutaway side view of the assembled mobile electronic device 10 in FIG. 6 is shown. The device 10 includes an upwardly facing male portion 24 and a downwardly facing female portion 26 and of the front cover 14 and rear cover 16, respectively, with a vertical section 92 and an angled section 94, in one embodiment. This embodiment provides a modified dovetail construction, for improved assembly or disassembly.

Figure 4:
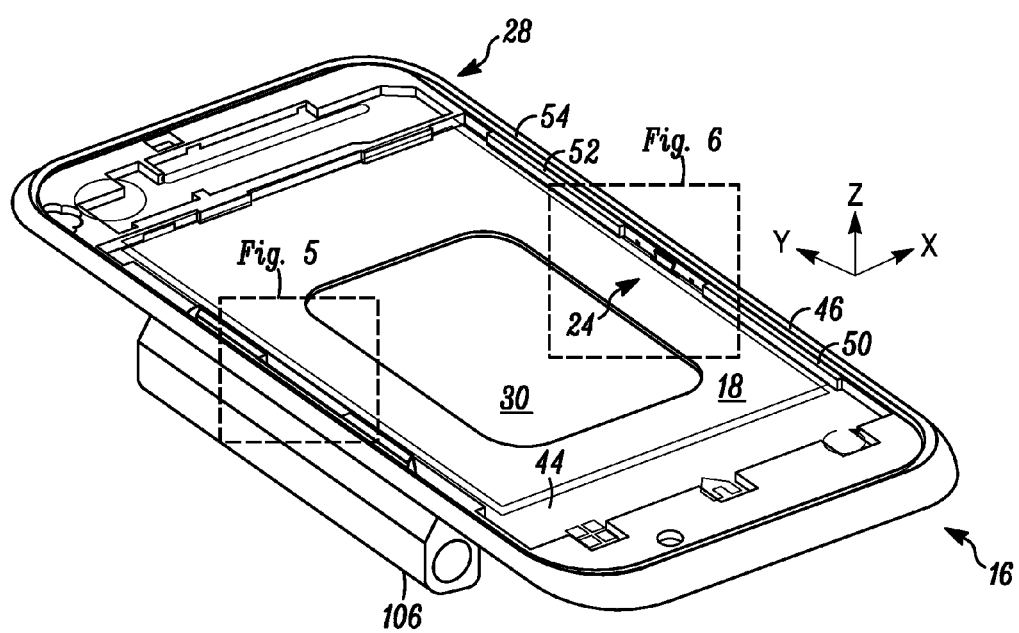
FIG. 4 is a perspective view of an embodiment of the mobile electronic device in FIG. 1, with a clear display to aid the reader, shown assembled, in accordance with principles of the present invention.
Figure 8:
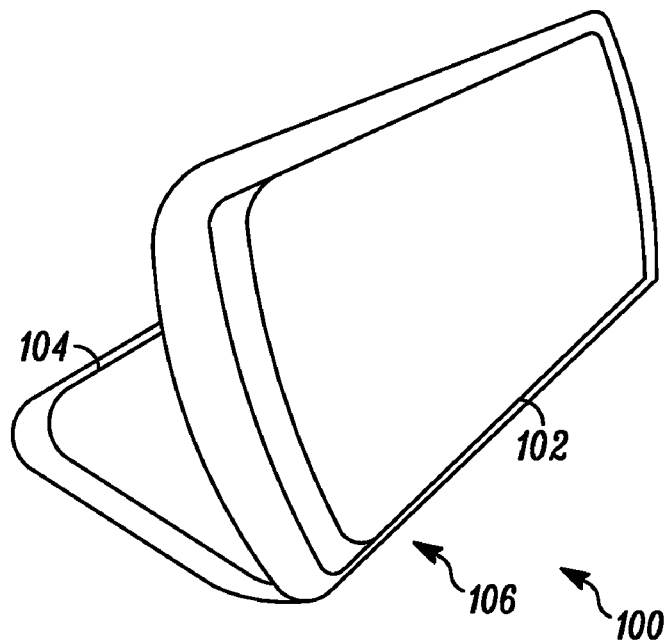
FIG. 8 is an enlarged partial perspective view of an embodiment of an assembled mobile electronic device, in the form of a flip phone with a narrow profile flip, a base and a hinge, in accordance with principles of the present invention.

In FIG. 8, a mobile electronic device 100 is shown, in the form of a flip phone with a narrow profile flip 102 and a base 104, connected with a hinge 106 in FIG. 4. Many of the components described with respect to item 10, are included in this embodiment.

Among the many advantages of the mobile electronic device are:
1. Superior capability.
2. Superb performance.
3. Enhanced audio.
4. Excellent navigation, scrolling, zooming and magnification.
5. Better detection of finger gestures.
7. Reliable.
8. Comfortable.
9. Light weight.
10. Portable.
11. User friendly.
12. Easy to use.
13. Durable
14. Economical.
15. Attractive.

Although embodiments of the invention have been shown and described, it is to be understood that various modifications, substitutions, and rearrangements of parts, components, and/or process (method) steps, as well as other uses of the mobile electronic device can be made by those skilled in the art without departing from the novel spirit and scope of this invention.

What is claimed is:

1. A mobile electronic device, comprising:
  a housing including a front cover and a rear cover, the rear cover configured to interconnect with the front cover defining an enclosure for electrical components;
  a plurality of connectors located on a plurality of walls of the front cover and rear cover;
  the plurality of connectors including a male portion and a female portion being substantially complementarily configured to receive the male portion,
  wherein the front cover includes a touchscreen display and the rear cover includes a touchpad positioned to be touched by a user's finger gestures, without blocking a user's viewing of the touchscreen display.

2. A mobile electronic device in accordance with claim 1 wherein the mobile electronic device includes at least one of: a flip phone, slider phone, portable networking device, internet communications device, clamshell device, tablet device, radio telephone, cellular phone, mobile phone, smart phone, portable gaming device, personal digital assistant, wireless e-mail device, two-way pager, mobile computing device and handheld electronic device.

3. A mobile electronic device in accordance with claim 1 wherein the mobile electronic device is of a compact size.

4. A mobile electronic device in accordance with claim 1 wherein the male portion includes a proximal portion and a distal portion, with the distal portion being larger in dimension than the proximal portion.

5. A mobile electronic device in accordance with claim 1 wherein the female portion defines a slot including a proximal portion and a distal portion, with the distal portion being smaller in dimensions than the proximal portion.

6. A mobile electronic device in accordance with claim 1 wherein the male portion includes a proximal portion and a distal portion, with the distal portion being larger in dimension than the proximal portion and the female portion defines a slot including a proximal portion and a distal portion, with the distal portion being smaller in dimensions than the proximal portion, the male portion and the female portion defining a dovetail structure forming a unified housing.

7. A mobile electronic device in accordance with claim 1 wherein the plurality of connectors are located on at least two opposite interior walls of the plurality of walls of the rear cover and at least two opposite external walls of the plurality of walls of the front cover.

8. A mobile electronic device in accordance with claim 1 wherein the plurality of connectors are located on at least two opposite interior walls of the plurality of walls of the rear cover facing substantially upwardly and at least two opposite external walls of the plurality of walls of the front cover facing substantially downwardly.

9. A mobile electronic device in accordance with claim 1 wherein at least one of the front cover and rear cover comprises a resilient material.

10. A mobile electronic device in accordance with claim 1 wherein at least one of the front cover and rear cover comprises aluminum.

11. A mobile electronic device in accordance with claim 1, wherein at least a portion of the front cover is configured to be received in a portion of the rear cover.

12. A mobile electronic device in accordance with claim 1, wherein the front cover includes a glass layer, touch sensor and an inner assembly configured to be at least partially received in a portion of the rear cover.

13. A mobile electronic device in accordance with claim 1, wherein the front cover includes an inner assembly configured to be at least partially received in a portion of the rear cover, including a north leg, a south leg, an east leg and a west leg defining an opening, with the plurality of connectors being located on at least two opposite legs.

14. A mobile electronic device in accordance with claim 1, wherein the front cover includes an inner assembly configured to be at least partially received in a portion of the rear cover, including a north leg, a south leg, an east leg and a west leg defining an opening, with the plurality of connectors being located on at least two opposite legs, the plurality of connectors being downwardly facing female portions extending from about a mid point to a bottom of the legs.

15. A mobile electronic device in accordance with claim 1, wherein the rear cover includes the plurality of connectors including upwardly facing male portions extending from about a middle portion to a bottom portion of the plurality of walls.

16. A mobile electronic device, comprising:
a housing including a front cover and a rear cover, the rear cover configured to interconnect with the front cover defining an enclosure for electrical components;
a plurality of connectors located on a plurality of walls of the front cover and rear cover;
the plurality of connectors including a male portion and a female portion being substantially complementarily configured to receive the male portion, wherein the front cover includes an inner assembly configured to be at least partially received in a portion of the rear cover, including a north leg, a south leg, an east leg and a west leg defining an opening, with the plurality of connectors being located on at least two opposite legs.

17. A mobile electronic device in accordance with claim 16 wherein the male portion includes a proximal portion and a distal portion, with the distal portion being larger in dimension than the proximal portion and the female portion defines a slot including a proximal portion and a distal portion, with the distal portion being smaller in dimensions than the proximal portion, the male portion and the female portion defining a dovetail structure forming a unified housing.

18. A mobile electronic device in accordance with claim 16, wherein the front cover includes a glass layer, touch sensor and an inner assembly configured to be at least partially received in a portion of the rear cover.

19. A mobile electronic device in accordance with claim 16 wherein at least one of the front cover and rear cover comprises a resilient material.

* * * * *